US010185607B1

(12) United States Patent
Gerweck et al.

(10) Patent No.: US 10,185,607 B1
(45) Date of Patent: Jan. 22, 2019

(54) DATA STATEMENT MONITORING AND CONTROL

(71) Applicant: AtScale, Inc., San Mateo, CA (US)

(72) Inventors: Sarah Gerweck, Santa Clara, CA (US);
David P. Mariani, Santa Clara, CA (US); Matthew Baird, Belmont, CA (US); Josh Klahr, San Mateo, CA (US); David Schreibman, San Francisco, CA (US)

(73) Assignee: AtScale, Inc., San Mateo, CA (US)

( * ) Notice: Subject to any disclaimer, the term of this patent is extended or adjusted under 35 U.S.C. 154(b) by 18 days.

(21) Appl. No.: 15/657,194

(22) Filed: Jul. 23, 2017

(51) Int. Cl.
*G06F 9/46* (2006.01)
*G06F 9/54* (2006.01)
*G06F 21/31* (2013.01)

(52) U.S. Cl.
CPC .............. *G06F 9/546* (2013.01); *G06F 9/542* (2013.01); *G06F 21/31* (2013.01)

(58) Field of Classification Search
CPC .... G06F 9/542; G06F 9/546; G06F 17/30463; G06F 17/30864
USPC .......................... 719/313, 318; 707/705, 713
See application file for complete search history.

(56) References Cited

U.S. PATENT DOCUMENTS

| | | | |
|---|---|---|---|
| 6,684,207 B1 | 1/2004 | Greenfield et al. | |
| 6,751,657 B1 * | 6/2004 | Zothner | G06F 9/542 709/203 |
| 8,010,554 B1 | 8/2011 | Zhou | |
| 8,239,529 B2 * | 8/2012 | Samdadiya | G06F 11/3006 709/203 |
| 9,158,816 B2 * | 10/2015 | Schindlauer | G06F 17/30477 |
| 9,600,554 B2 | 3/2017 | Gerweck et al. | |
| 2004/0236767 A1 | 11/2004 | Soylemez et al. | |
| 2005/0278290 A1 | 12/2005 | Bruce | |
| 2007/0208721 A1 | 9/2007 | Zaman | |
| 2009/0018996 A1 | 1/2009 | Hunt et al. | |
| 2009/0249125 A1 | 10/2009 | Bhatawdekar et al. | |

(Continued)

OTHER PUBLICATIONS https://451research.com/report-short?entityId=92407, 451 Research Impact Report, "Kyvos adds SQL support, availability on Google Cloud for OLAP-on-Hadoop" May 8, 2017, 1 page.

(Continued)

*Primary Examiner* — Andy Ho
(74) *Attorney, Agent, or Firm* — Patrick E. Caldwell, Esq.; The Caldwell Firm, LLC

(57) ABSTRACT

Techniques are presented for performing enhanced real-time data statement monitoring and control without requiring modifications to data analysis client applications or data storage environments. A data statement processing layer is implemented between the data analysis client applications and the data storage environments. A data statement management agent interacts with an event bus in the data statement processing layer. The data statement management agent accesses event objects on the event bus that are generated during the processing of data statements. Rules are applied to select particular event objects. The selected event objects are transformed into event messages that are delivered to the client applications to monitor the processing of the data statements. Control commands received from the client application are transformed into event objects that are issued to the event bus to control the processing of the data statement.

20 Claims, 9 Drawing Sheets

(56) References Cited

U.S. PATENT DOCUMENTS

| | | |
|---|---|---|
| 2011/0252049 A1 | 10/2011 | Marinescu et al. |
| 2012/0089564 A1 | 4/2012 | Bakalash et al. |
| 2012/0102453 A1 | 4/2012 | Patch et al. |
| 2015/0278334 A1 | 10/2015 | Gerweck et al. |
| 2018/0096013 A1* | 4/2018 | Warshavsky ...... G06F 17/30342 |
| 2018/0114425 A1* | 4/2018 | Logan ................ G08B 21/0446 |

OTHER PUBLICATIONS https://www.slideshare.net/AtulSharma225/kyvos-insights-datasheet-60646546 "Kyvos insights", Apr. 8, 2016, 2 pages.

International Preliminary Report & Written Opinion of PCT Application No. PCT/US2015/0022082, dated Jun. 25, 2015, 3 pages total.

International Search Report & Written Opinion of PCT Application No. PCT/US2016/031684, dated Oct. 19, 2016, 6 pages total.

https://www.ibm.com/support/knowledgecenter/en/ssw_i5_54/rzajq/rzajqdispatcher.htm, "Query Dispatcher", downloaded May 2, 2017, 1 page.

\* cited by examiner

DATA STATEMENT MONITORING AND CONTROL

FIELD

This disclosure relates to data analytics, and more particularly to techniques for data statement monitoring and control.

BACKGROUND

With the continued proliferation of information sensing devices (e.g., mobile phones, online computers, RFID tags, sensors, etc.), increasingly larger volumes of data are collected for various business intelligence (BI) purposes. For example, the web browsing activities of online users are captured in various datasets (e.g., cookies, log files, etc.) that are used by online advertisers in targeted advertising campaigns. Data from operational sources (e.g., point of sale systems, accounting systems, CRM systems, etc.) can be combined with data from online sources. With such large volumes of data from varying sources and with varying structures (e.g., relational, multidimensional, delimited flat file, document, etc.), the use of data warehouses, distributed file systems (e.g., Hadoop distributed file system or HDFS), and/or other data storage environments to store and access data has increased. For example, an HDFS environment can be implemented for datasets having a flat file structure with predetermined delimiters and associated metadata.

Syntax and semantics for such metadata can be defined so as to accommodate a broad range of data types and structures. For example, metadata might describe keys that are used to access the delimited data values that comprise the datasets. The users (e.g., BI analysts) of such large and dynamic datasets desire to query the datasets in certain ways, using familiar capabilities that derive from a relatively small set of BI tools (e.g., Excel, Tableau, Qlik, etc.). In many cases, an enterprise makes capital and organizational investments in a particular BI tool (e.g., to obtain licenses, train staff, etc.). Commensurate with such capital and organizational investments, the enterprise would desire to use that tool to access any and all current and future data storage environments that may comprise data of interest to the enterprise.

Unfortunately, accessing data across multiple data storage environments from a particular BI tool is fraught with any number of challenges. For example, BI tools often employ standard protocols (e.g., XMLA, HS2, HTTP, etc.) to securely and reliably interact with (e.g., submit queries to) the various query engines (e.g., Impala, Spark SQL, Hive, Drill, Presto, etc.) associated with respective data storage environments (e.g., an HDFS environment, a relational database management system or RDMS environment, a SQL data warehouse environment, etc.). However, such standard protocols are limited in their functionality, at least in that certain of such standard protocols (e.g., XMLA) might merely facilitate sending a query (e.g., issuing data statements from a BI tool to a storage environment) and receiving the query results (e.g., at the BI tool). During the performance of the protocol, user activity is suspended (e.g., blocked) between the time of sending the query and the time of receiving the results. The duration of the suspension while the user is waiting can be several seconds, or minutes or longer for successively larger datasets. Wait times of this magnitude detract from the user experience. Moreover, a user might not know how long of a wait time to expect, resulting in further degradation of the user experience.

Other protocols (e.g., HS2) might facilitate polling for a high order query status (e.g., in process, complete, failed, etc.) and informing the user of such status, but still leaves the user waiting for an unknown period of time until query completion (or failure). To provide more information to the user of the BI tool, some approaches rely on a custom protocol that extends the capabilities of the standard protocols. However, such custom solutions involve implementation of certain components (e.g., custom application programming interfaces or APIs and/or custom user interfaces or UIs, etc.), the implementation of which often covers the entire software stack to facilitate operation of such custom solutions.

For example, a custom solution from each of the many query engines across multiple data storage environments would involve implementing many respective APIs and UIs in the BI tools. Such custom implementations in the BI tools and/or other points the software stack might be difficult or impossible to obtain. What is needed is an environment-independent and tool-independent technological solution that facilitates enhanced data statement (e.g., query) management (e.g., monitoring, control, etc.) by users of BI tools. More specifically, what is needed is fine-grained management of data statements issued from BI tools to multiple heterogeneous data storage environments without modifying the BI tools.

What is needed is a technique or techniques to improve over legacy techniques and/or over other considered approaches. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure provides a detailed description of techniques used in systems, methods, and in computer program products for data statement monitoring and control, which techniques advance the relevant technologies to address technological issues with legacy approaches. More specifically, the present disclosure provides a detailed description of techniques used in systems, methods, and in computer program products for real-time data statement monitoring and control over multiple data storage environments. Certain embodiments are directed to technological solutions for implementing a data statement management agent that interacts with an event bus in a data statement processing layer to facilitate enhanced data statement management over multiple data storage environments.

The disclosed embodiments modify and improve over legacy approaches. In particular, the herein-disclosed techniques provide technical solutions that address the technical problems attendant to missing or low-functionality data statement management capability pertaining to data statements issued to operate over multiple heterogeneous data storage environments. Such technical solutions relate to improvements in computer functionality. Various applications of the herein-disclosed improvements in computer functionality serve to reduce the demand for computer memory, reduce the demand for computer processing power, reduce network bandwidth use, and reduce the demand for inter-component communication. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of business intelligence systems as well as advances in various technical fields related to managing heterogeneous computing systems.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1:
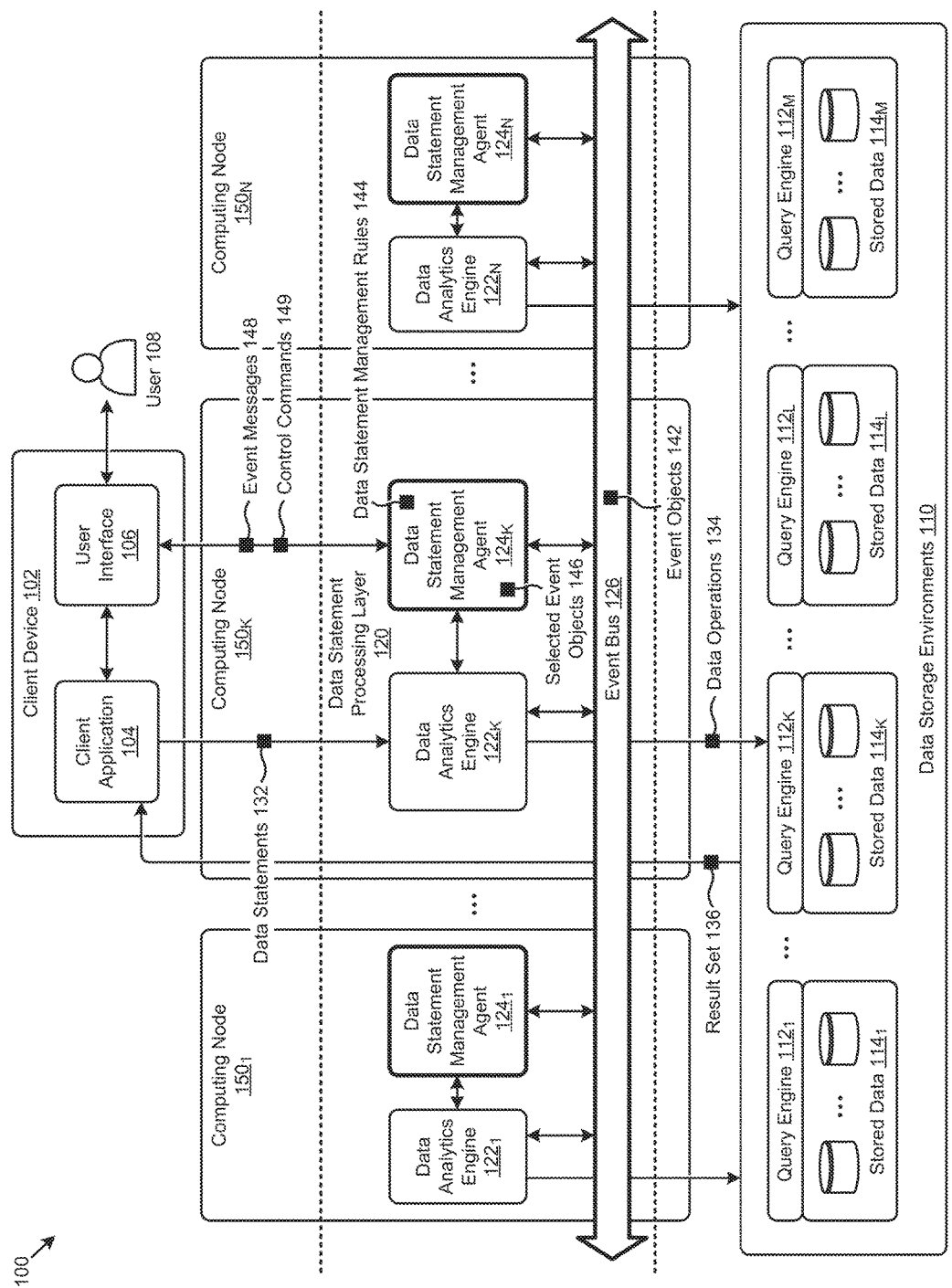
FIG. 1 is a diagram that depicts a selection of implementation techniques for real-time data statement monitoring and control over multiple data storage environments, according to some embodiments.

Embodiments in accordance with the present disclosure address the problem of missing or low-functionality data statement management capability pertaining to data statements issued to operate over multiple heterogeneous data storage environments. Some embodiments are directed to approaches for implementing a data statement management agent that interacts with an event bus in a data statement processing layer to facilitate enhanced data statement management over multiple data storage environments. The accompanying figures and discussions herein present example environments, systems, methods, and computer program products for real-time data statement monitoring and control over multiple data storage environments.

Overview

Disclosed herein are techniques for implementing a data statement management agent that interacts with an event bus in a data statement processing layer to facilitate enhanced data statement management over multiple data storage environments. In certain embodiments, the data statement processing layer operates on one or more computing nodes (e.g., servers) and interfaces with various client applications (e.g., BI tools) and data storage environments (e.g., HDFS environments, RDBMS environments, etc.). The event bus at the data statement processing layer transmits various event objects pertaining to data statements being processed at the data statement processing layer. The data statement management agent accesses various data statement management rules corresponding to the users of the client applications. These data statement management rules are applied to the event objects to identify a set of selected event objects. The selected event objects are transformed into one or more event messages that are delivered in real time to the users at the client applications. The real-time delivery of the event messages facilitates enhanced data statement management (e.g., query monitoring) for the users. In certain embodiments, control commands from the client applications are received by the data statement management agent and issued to the data statement processing layer to effect one or more data statements being processed. Such real-time user interaction with issued data statements further facilitates enhanced data statement management (e.g., query control).

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1 is a diagram that depicts a selection of implementation techniques 100 for real-time data statement monitoring and control over multiple data storage environments. As an option, one or more variations of implementation techniques 100 or any aspect thereof may be implemented in the context of the architecture and functionality of the embodiments described herein. The implementation techniques 100 or any aspect thereof may be implemented in any environment.

The embodiment shown in FIG. 1 illustrates merely one example implementation of the herein disclosed techniques for real-time data statement monitoring and control over multiple data storage environments. As shown, the techniques are implemented in a data statement processing layer 120 that spans multiple computing nodes (e.g., computing node $150_1$, computing node $150_K$, and computing node $150_N$) in, for example, a distributed computing system. A data statement processing layer, such as data statement processing layer 120, transforms data statements from various client applications (e.g., BI tools) into data operations that operate on various datasets stored in a plurality of data storage environments. In some cases, the transformations comprise mapping the data statement semantics to the data operation semantics and/or optimizing (e.g., for minimal execution times) the data operations for the target datasets and/or data storage environments. As can be observed, each of the data storage environments 110 accessible by data statement processing layer 120 might comprise a particular query engine (e.g., query engine $112_1$, query engine $112_K$, query engine $112_L$, and query engine $112_M$) configured to operate on a corresponding set of stored data (e.g., stored data $114_1$, stored data $114_K$, stored data $114_L$, and stored data $114_M$). The stored data in data storage environments 110 can be organized in accordance with various architectures (e.g., HDFS, RDBMS, etc.) having a respective variety of query engines (e.g., Impala, Spark SQL, Hive, Drill, Presto, etc.). As an example, data statement processing layer 120 might transform a SQL data query from Tableau into data operations that are specifically formatted for an Impala query engine to operate on a dataset in an HDFS environment.

The data statements are processed (e.g., analyzed, planned, executed, etc.) by instances of a data analytics engine (e.g., data analytics engine $122_1$, data analytics engine $122_K$, and data analytics engine $122_N$) at the computing nodes in data statement processing layer 120. Specifically, referring to data analytics engine $122_K$ in computing node $150_K$, data statements 132 from client application 104 at client device 102 are processed by data analytics engine $122_K$. For example, a user 108 might interact with a user interface 106 at client device 102 to issue the data statements. Such data statements can comprise data definition language (DDL) statements, data manipulation language (DML) statements (e.g., data queries), transaction control statements, session control statements, system control statements, embedded statements, and/or other structured programming code to operate over one or more datasets. A set of data operations 134 derived from data statements 132 are issued by data analytics engine $122_K$ to, for example, query engine $112_K$ for operation on stored data $114_K$. A result set 136 generated from data operations 134 is returned to client application 104 and viewed, for example, by user 108 at user interface 106. As earlier mentioned, however, capabilities for monitoring and/or controlling the processed data statements can be limited.

As depicted in the embodiment of FIG. 1, the herein disclosed techniques address such limitations, at least in part, by implementing an event bus 126 and instances of a data statement management agent (e.g., data statement management agent $124_1$, data statement management agent $124_K$, and data statement management agent $124_N$) in data statement processing layer 120. Event bus 126 transmits various instances of event objects 142 pertaining to data statements being processed at data statement processing layer 120. In some cases, event objects associated with data statements processed at one computing node might be accessible at another computing node. The instances of the data statement management agent access various data statement management rules corresponding to the users of the client applications, and apply the data statement management rules to the event objects to identify a set of selected event objects.

Specifically, as shown in FIG. 1, data statement management agent $124_K$ applies the data statement management rules 144 (e.g., associated with user 108 and client application 104 at client device 102) to event objects 142 to identify a set of selected event objects 146. Selected event objects 146 are then transformed into instances of event messages 148 that are delivered in real time to user 108 at client application 104. The real-time delivery of the event messages facilitates enhanced data statement management (e.g., query monitoring) for users such as user 108. In certain embodiments, control commands from the client applications are received by the data statement management agent and issued to data statement processing layer 120 to effect one or more data statements being processed. Such control commands comprise information that is interpreted to invoke one or more actions and/or operations. In some cases, the information of a control command is organized as a programming object (e.g., in JSON) to facilitate electronic transfer to and/or interpretation by a receiving entity. For example, control commands 149 might be invoked by user 108 at user interface 106 of client device 102 and sent to data statement management agent $124_K$ to effect (e.g., cancel, pause, etc.) one or more of the data statements 132 processed at data statement processing layer 120. Such real-time user interaction with issued data statements (e.g., data statements 132) further facilitates enhanced data statement management (e.g., query control). The foregoing enhanced data statement management (e.g., query monitoring, query control, etc.) facilitated by the herein disclosed techniques is implemented in unmodified instances of the client application and data storage environments. Specifically, the data statement processing layer 120 can be implemented without any modifications to the client application or data storage environments.

Figure 2:
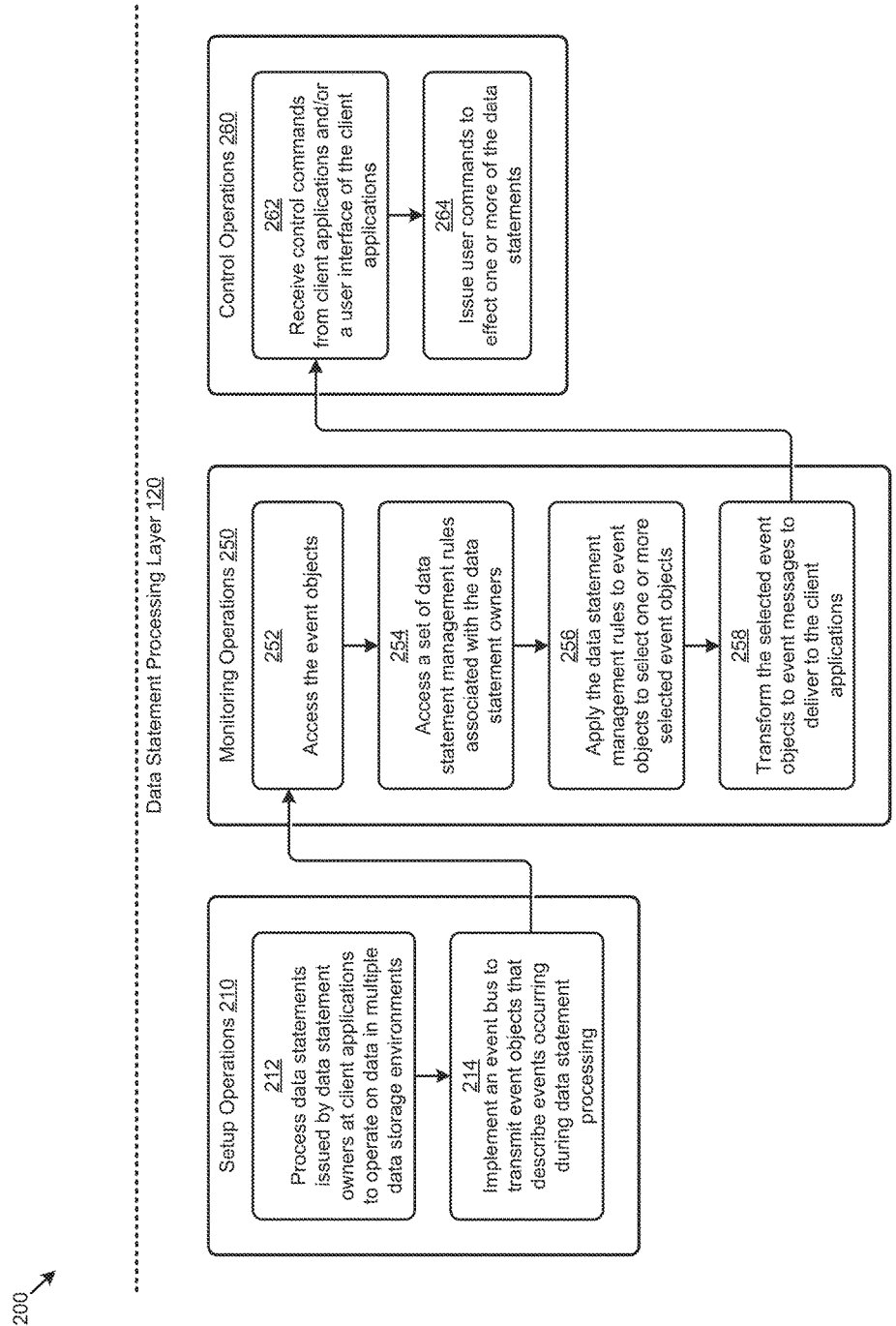
FIG. 2 depicts a data statement management technique as implemented in systems that facilitate real-time data statement monitoring and control over multiple data storage environments, according to some embodiments.

Further details describing the aforementioned data statement processing, monitoring, and control operations as facilitated by the herein disclosed techniques are presented and discussed as pertains to FIG. 2.

FIG. 2 depicts a data statement management technique 200 as implemented in systems that facilitate real-time data statement monitoring and control over multiple data storage environments. As an option, one or more variations of data statement management technique 200 or any aspect thereof may be implemented in the context of the architecture and functionality of the embodiments described herein. The data statement management technique 200 or any aspect thereof may be implemented in any environment.

The data statement management technique 200 presents one embodiment of certain steps and/or operations that facilitate real-time data statement monitoring and control over multiple data storage environments. As shown, the steps and/or operations can be grouped in a set of setup operations 210, a set of monitoring operations 250, and a set of control operations 260. In certain embodiments, these operations can be performed in data statement processing layer 120 as described herein.

As illustrated, the setup operations 210 of data statement management technique 200 can commence by processing data statements issued by data statement owners at client applications (e.g., BI tools) to operate on data stored in multiple data storage environments (step 212). Any number of client applications and/or data storage environments is possible. A data statement owner might be defined by a user identifier, a combination of a user identifier and a connection identifier (e.g., of identifying a connection to the client application), and/or other identifiers and/or combinations thereof. In some cases, a data statement may have multiple data statement owners, some of which that did not issue the data statement. As further shown in setup operations 210, an event bus is implemented (e.g., at the data statement processing layer 120) to transmit event objects that describe various events that occur during data statement processing (step 214). An event object can be any programming object (e.g., instance of a class) that relates various object attributes (e.g., event identifier, timestamp, etc.) associated with a particular event. Certain attributes of an event object might describe, for example, the processing progress of a particular data statement or a metadata change resulting from the processing of a data statement. Event object attributes and data structures are further discussed as pertaining to FIG. 3.

The monitoring operations 250 shown in FIG. 2 can commence by accessing the event objects (step 252). In environments where data statement processing layer 120 spans multiple physical computing resources (e.g., node appliances at various geographical sites), the event objects originating at one computing resource might be accessible at other computing resources. Further, a set of data statement management rules associated with a respective set of data statement owners is accessed (step 254). A set of rules (e.g., a rule base) such as the data statement management rules comprise data records that store various information that can be used to form one or more constraints to apply to certain functions and/or operations.

For example, the information pertaining to a rule in the rule base might comprise the conditional logic operands (e.g., input variables, constraints, etc.) and/or operators (e.g., "if", "then", "and", "or", "greater than", "less than", etc.) for forming a conditional logic statement that returns one or more results. In this case, the data statement management rules are applied to event objects to select one or more selected event objects (step 256). For example, the data statement management rules might specify an interest only in event types identified by "e03" and "e07". As such, event objects associated with type identifiers "e03" and "e07" will be included in the selected event objects, while other event objects will be filtered out from the selected event objects.

The selected event objects are then transformed into event messages that are delivered to the client applications (step 258). For example, the attributes of one or more selected event objects might be used to generate a human-readable message (e.g., "Your query has entered the query planning phase.") for viewing by a user in a user interface. Other event messages might describe a received query, an incoming query, a planned query, an outgoing query, a query execution time estimate, a query completion indicator, a query failure indicator, one or more subquery operations, and/or other information.

In certain embodiments, the herein disclosed techniques can further facilitate data statement control operations. While data statement monitoring operations might push event messages pertaining to certain data statements to a user, data statement control operations receive control commands pertaining to certain data statements from a user. Specifically, the control operations 260 shown in FIG. 2 receive one or more control commands from the client applications and/or the user interface (e.g., as directed by a user) of the client applications (step 262). These control commands are issued to effect one or more of the data statements being processed (step 264). For example, a data statement owner might invoke a control command to cancel a particular data statement, which control command, in turn, is issued (e.g., through the event bus 126) to an instance of an executor in data statement processing layer 120 to cancel execution of the data statement.

Figure 3:
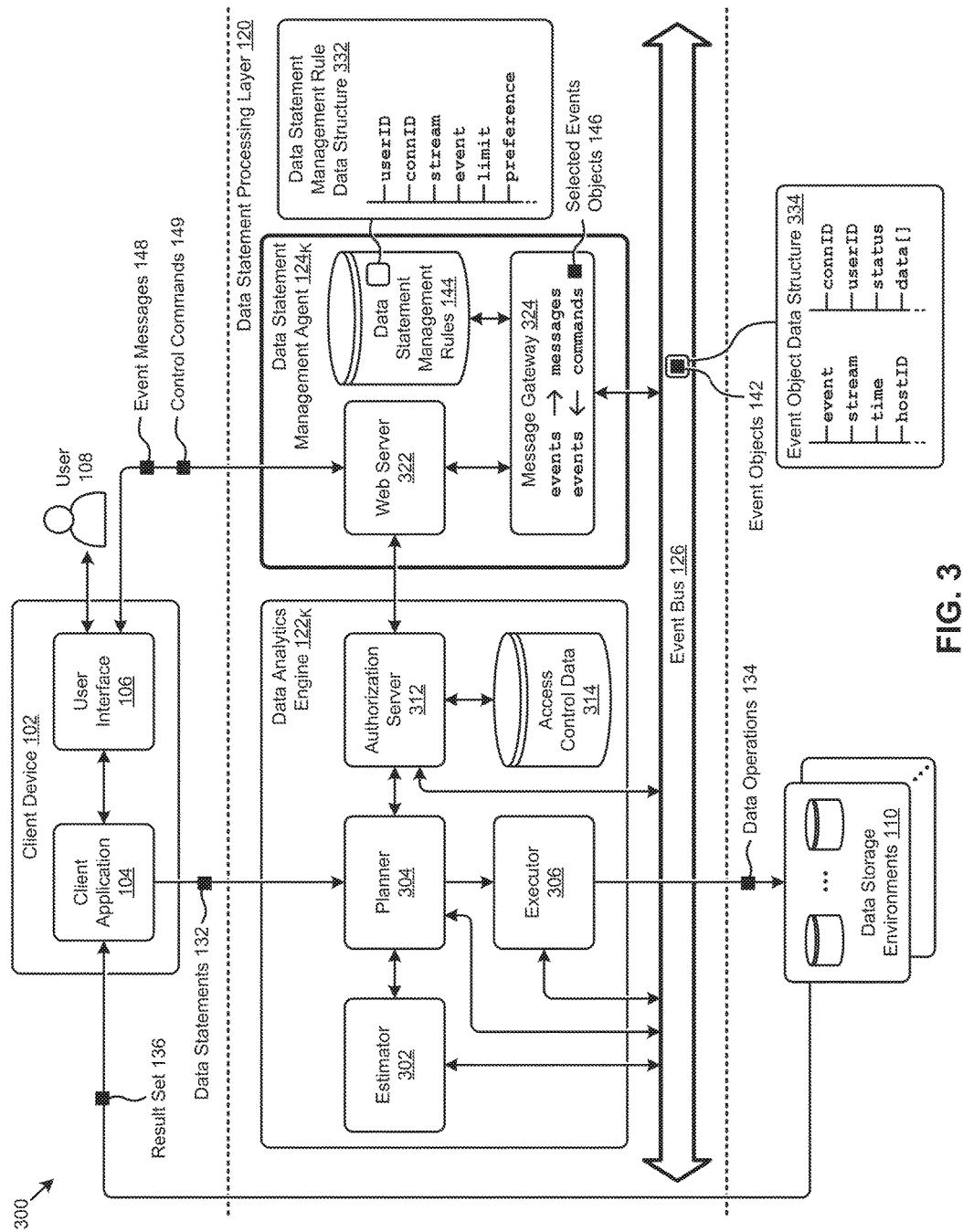
FIG. 3 is a block diagram of a data statement management system that implements real-time data statement monitoring and control over multiple data storage environments, according to an embodiment.

A detailed embodiment of a system and associated data structures that implement the techniques disclosed herein is shown and described as pertains to FIG. 3.

FIG. 3 is a block diagram of a data statement management system 300 that implements real-time data statement monitoring and control over multiple data storage environments. As an option, one or more variations of data statement management system 300 or any aspect thereof may be implemented in the context of the architecture and functionality of the embodiments described herein. The data statement management system 300 or any aspect thereof may be implemented in any environment.

As shown in the embodiment of FIG. 3, event bus 126, data statement management agent $124_K$, and data analytics engine $122_K$ in data statement processing layer 120, and other components in data statement management system 300, can interact to implement the herein disclosed techniques for real-time data statement monitoring and control over multiple data storage environments (e.g., data storage environments 110). Certain specialized data structures that are designed to improve the way a computer stores and retrieves data in memory when performing such techniques are also shown.

As earlier described, data statements 132 from client application 104 at client device 102 are processed by data analytics engine $122_K$ to generate a set of data operations 134 that are issued to various instances of data storage environments 110. A result set 136 responsive to issuing the data operations 134 is returned to client application 104 and viewed, for example, by user 108 at user interface 106. More specifically, data statements 132 (e.g., SQL queries, MDX queries, etc.) are received at data analytics engine $122_K$ by a planner 304. The planner interacts with an authorization server 312 to determine if the data statements are authorized to be executed.

For example, authorization server 312 might access a set of access control data 314 to authenticate a data statement owner and/or determine whether the data statement owner (e.g., user, client application, client device, or combination thereof) is authorized to access the underlying data of a particular data statement or data statements. Other authorization constraints (e.g., execution time limit for certain user roles, etc.) might also be enforced. Further, authorization server 312 might implement any protocol (e.g., OAuth2, Kerberos, LDAP, etc.) to perform the authentication and/or authorization.

If the data statement owner is authenticated and authorized to issue a particular data statement, planner 304 performs certain operations (e.g., analysis, optimization, aggregate generation, statement generation, etc.) to generate one or more data operations from the data statement. In some cases, an estimator 302 is implemented to determine an estimate of the execution time of the data statement. The generated data operations are delivered to an executor 306 for issuance to a target data storage environment from the data storage environments 110. As can be observed, the active components (e.g., estimator 302, planner 304, executor 306, and authorization server 312) of data analytics engine $122_K$ interact with event bus 126 to send and receive event objects (e.g., event objects 142) to and from the event during performance of their respective operations.

As earlier described, an event object can be any programming object (e.g., instance of a class) that relates various object attributes associated with a particular event. For example, as depicted in an event object data structure 334, an event object might relate an event type (e.g., stored in an "event" field), a stream type (e.g., "event" or "metadata" stream type stored in a "stream" field), a time stamp (e.g., stored in a "time" field), a computing host identifier (e.g., stored in a "hostID" field), a data statement owner connection identifier (e.g., stored in a "connID" field), a user identifier (e.g., stored in a "userID" field), a status indicator (e.g., stored in a "status" field), a collection of data elements (e.g., stored in a "data [ ]" tuple), and/or other object attributes.

As shown, a message gateway 324 at data statement management agent $124_K$ accesses the event objects on event bus 126 to facilitate the herein disclosed techniques. In some cases, message gateway 324 is informed by a web server 322 at data statement management agent $124_K$ of data statement owners that desire to monitor and control their respective data statements. Specifically, web server 322 receives data statement owner credentials from, for example, user 108 at client device 102. More specifically, user 108 might submit certain data statement owner credentials to web server 322 from user interface 106 at client device 102. In some cases, user interface 106 might be provided by a native application (e.g., client application 104 or other application) at client device 102. In other cases, user interface 106 might be rendered by web server 322 in a browser at client device 102. As can be observed, web server 322 can submit the data statement owner credentials (e.g., user identifier, client device identifier, client application identifier, etc.) to authorization server 312 to authenticate and/or authorize the data statement owner to use the services (e.g., data statement monitoring and control services) provided by data statement management agent $124_K$.

If the data statement owner is authenticated and authorized to use such services, a channel (e.g., a WebSocket connection) is established between web server 322 and client device 102. Further, a portion of the data statement management rules 144 associated with the data statement owner are accessed. As earlier discussed, data statement management rules 144 comprise data records that store various information that can be used to form one or more constraints to apply to certain functions and/or operations. As depicted in a data statement management rule data structure 332, various data that derives to one or more rules are associated with a particular data statement owner, which data statement owner is characterized by a user identifier (e.g., stored in a "userID" field) and/or a connection identifier (e.g., an identifier corresponding to the connection between the web server and the client device, stored in a "connID" field). The rule attributes associated with the data statement owner in data statement management rule data structure 332 can describe a stream type (e.g., stored in a "stream" field), an event type (e.g., stored in an "event" field), a metric limit (e.g., a key-value pair stored in a "limit" field), a preference indicator (e.g., stored in a "preference" field), and/or other rule attributes.

Message gateway 324 applies the foregoing data statement management rules for the data statement owner to event objects 142 to identify a set of selected event objects (e.g., selected event objects 146). The selected event objects are transformed by message gateway 324 to one or more event messages (e.g., event messages 148) that are delivered to client device 102. As an example, the event messages might be organized (e.g., as JSON messages, XML message, etc.) and delivered (e.g., using HTTP, SOAP, CORBA, etc.) by web server 322 to be rendered in user interface 106 for viewing by user 108.

In certain embodiments, various control commands (e.g., control commands 149) are received at web server 322. If the issuer (e.g., user 108) of the control commands is authorized (e.g., by authorization server 312) to issue the commands, web server 322 can forward the control commands to message gateway 324 for processing. Processing at message gateway 324 might include, for example, converting the control commands to event objects that are placed on event bus 126 for various listening recipients (e.g., executor 306) so as to effect (e.g., cancel, pause, etc.) certain data statements.

The specific example of a data statement management system shown in FIG. 3 is purely exemplary, and other systems and/or subsystems and/or partitions and/or data structures are reasonable. One embodiment of a computing and/or storage environment for implementing such systems, subsystems, partitions, and/or data structures is shown and described as pertaining to FIG. 4.

Figure 4:
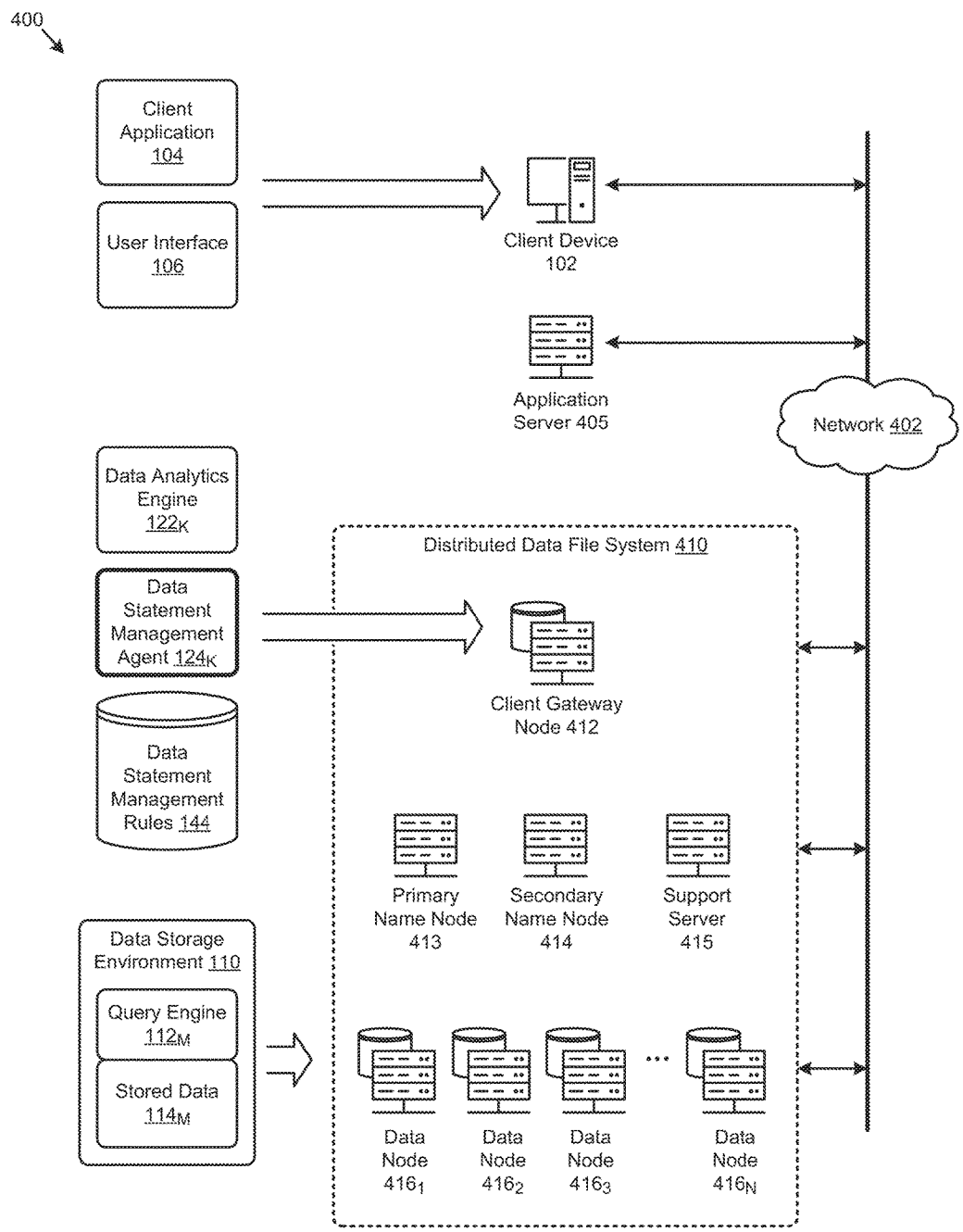
FIG. 4 is a schematic of a computing environment suitable for implementing real-time data statement monitoring and control over multiple data storage environments, according to an embodiment.

FIG. 4 is a schematic of a computing environment 400 suitable for implementing real-time data statement monitoring and control over multiple data storage environments. As an option, one or more variations of computing environment 400 or any aspect thereof may be implemented in the context of the architecture and functionality of the embodiments described herein. The computing environment 400 or any aspect thereof may be implemented in any environment.

As shown in FIG. 4, computing environment 400 comprises one or more instances of client device 102 (e.g., a desktop computer, laptop computer, mobile phone, etc.), one or more instances of an application server 405, and one or more instances of a distributed data file system 410. The aforementioned devices, servers, and systems can communicate through a network 402 (e.g., a wireless network, a wide area network (WAN), a local area network (LAN), the Internet, an intranet, a private network, etc.). The shown architecture of distributed data file system 410 can facilitate storage and processing of large volumes of data (e.g., in an HDFS framework).

Specifically, the architecture of distributed data file system 410 comprises one or more instances of a client gateway node 412, one or more instances of a primary name node 413, one or more instances of a secondary name node 414, one or more instances of a support server 415 (e.g., executing data analysis processes, etc.), and a plurality of data nodes (e.g., data node $416_1$, data node $416_2$, data node $416_3$, . . . , data node $416_N$). In some implementations, distributed data file system 410 can store large files of data physically distributed across multiple computing devices (e.g., the plurality of data nodes), rather than store the files entirely on a single computing device with a large amount of storage capacity.

To accommodate such distributed storage, the plurality of data nodes can be configured with one or more rack-mounted servers coupled (e.g., by SATA or SAS interconnects) to multiple solid-state drives (SSDs) and/or hard disk drives (HDDs) for storing the data. As an example, when a file is loaded into distributed data file system 410, it is replicated and partitioned (e.g., sharded) into "blocks" of data, which are distributed and stored across the plurality of data nodes. The primary name node 413 is responsible for storage and management of metadata associated with the data and/or other entities associated with distributed data file system 410 such that, for example, the primary name node 413 can provide data location information for data processing operations.

Further, other configurations, partitions, and architectures of distributed data file system 410 shown in computing environment 400 are possible. For example, a single-node implementation may have all of the nodes (e.g., client gateway node 412, primary name node 413, the plurality of data nodes, etc.) reside on a single computing device. Also, a small cluster of two nodes may have a first computing device operate as a name node and a second computing device operate as a data node. Distributed data file system 410 can represent any database management system.

In one or more embodiments, the aforementioned devices, servers, and systems in computing environment 400 can be configured to implement techniques for real-time data statement monitoring and control over multiple data storage environments as described herein. As can be observed, certain components earlier described for implementing the herein disclosed techniques are mapped to client device 102 and distributed data file system 410 of computing environment 400. More specifically, as shown, the client device 102 can store program instructions corresponding to the operations of client application 104 and/or user interface 106. Further, client gateway node 412 can store program instructions corresponding to the operations of an instance of the data analytics engine (e.g., data analytics engine $122_K$) and an instance of the data statement management agent (e.g., data statement management agent $124_K$). Data statement management rules 144 can also be stored in a storage facility (e.g., one or more SSDs and/or HDDs) coupled to client gateway node 412. The data storage environment distributed across the plurality of data nodes can be operated over by a query engine (e.g., query engine $112_M$) that communicates with a set of storage facilities comprising certain stored data (e.g., stored data $114_M$).

Figure 5:
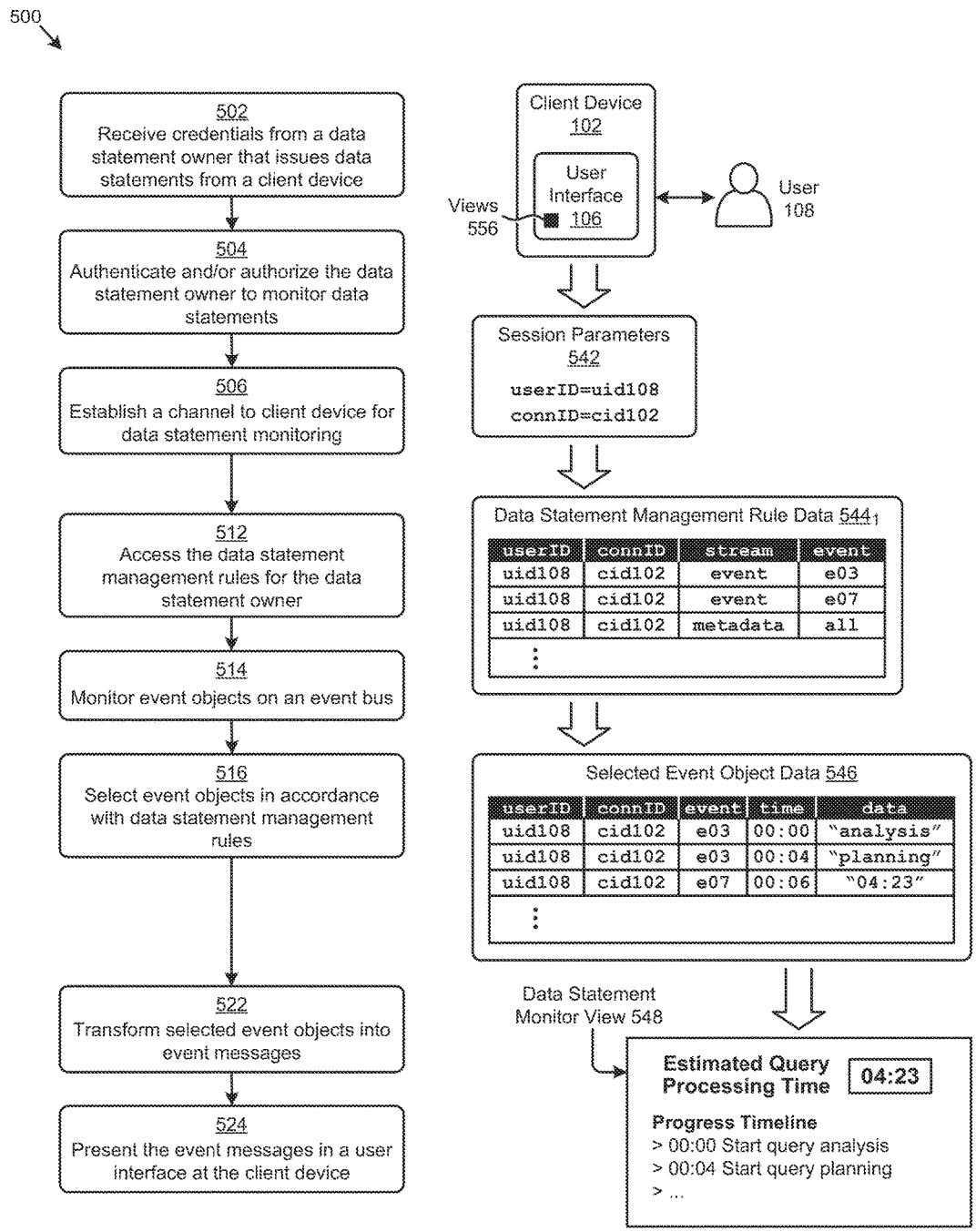
FIG. 5 exemplifies a data statement monitoring technique as implemented in systems that facilitate real-time data statement monitoring and control over multiple data storage environments, according to an embodiment.

One embodiment of a data statement monitoring technique that can be implemented in the foregoing computing environment is shown and described as pertaining to FIG. 5.

FIG. 5 exemplifies a data statement monitoring technique 500 as implemented in systems that facilitate real-time data statement monitoring and control over multiple data storage environments. As an option, one or more variations of data statement monitoring technique 500 or any aspect thereof may be implemented in the context of the architecture and functionality of the embodiments described herein. The data statement monitoring technique 500 or any aspect thereof may be implemented in any environment.

The data statement monitoring technique 500 presents one embodiment of certain steps and/or operations for performing real-time monitoring of data statements issued to operate over multiple data storage domains, according to the herein disclosed techniques. Various illustrations are also shown to further describe the data statement monitoring technique 500.

As shown, data statement monitoring technique 500 can commence by receiving a set of credentials from a data statement owner that issues data statements from a client device (step 502). As an example, the data statement owner credentials might comprise any combination of credentials from user 108 (e.g., username and password), credentials from client device 102 (e.g., unique device identifier), and/or other credentials associated with user 108 and/or client device 102 (e.g., enterprise identifier, client identifier, etc.). Using the data statement owner credentials, the data statement owner is authenticated and authorized to, for example, monitor certain data statements (step 504). Once authenticated and/or authorized, a channel is established to facilitate data statement monitoring at the client device (step 506). In some cases, establishing the channel for a particular data statement owner can, in turn, establish a unique data statement management session. For example, as depicted in session parameters 542, an instance of such a data statement management session might be defined by a unique combination of a user identifier (e.g., "userID=uid108") and a connection identifier (e.g., "connID=cid102").

The session parameters can be used to access the data statement management rules associated with the data statement owner (step 512). As can be observed in the selected data shown in data statement management rule data $544_1$, the rule data associated with "userID=uid108" at "connID=cid102" indicates an interest in event types "e03" and "e07" from the "event" stream, and "all" of the event types from the "metadata" stream. As merely an example, event type "e03" might pertain to query status change events, while event type "e07" might pertain to query execution time estimate events. The event objects on an event bus are then monitored (step 514) to select event objects in accordance with the data statement management rules (step 516). For example, as shown in selected event object data 546, the event objects recorded are of the types "e03" and "e07" in accordance with data statement management rule data $544_1$.

The data corresponding to the selected event objects is used to transform the selected event objects to event messages (step 522) that are presented in a user interface at the client device (step 524). For example, the selected event object data 546 can be used to generate event messages that are rendered in a data statement monitor view 548 included in a set of views 556 at user interface 106 of client device 102. As illustrated, the data from event type "e07" of selected event object data 546 is transformed into a banner message in data statement monitor view 548 depicting an "Estimated Query Processing Time" of "04:23". Further, the data from event type "e03" of selected event object data 546 is transformed into a query processing progress timeline in data statement monitor view 548.

Figure 6:
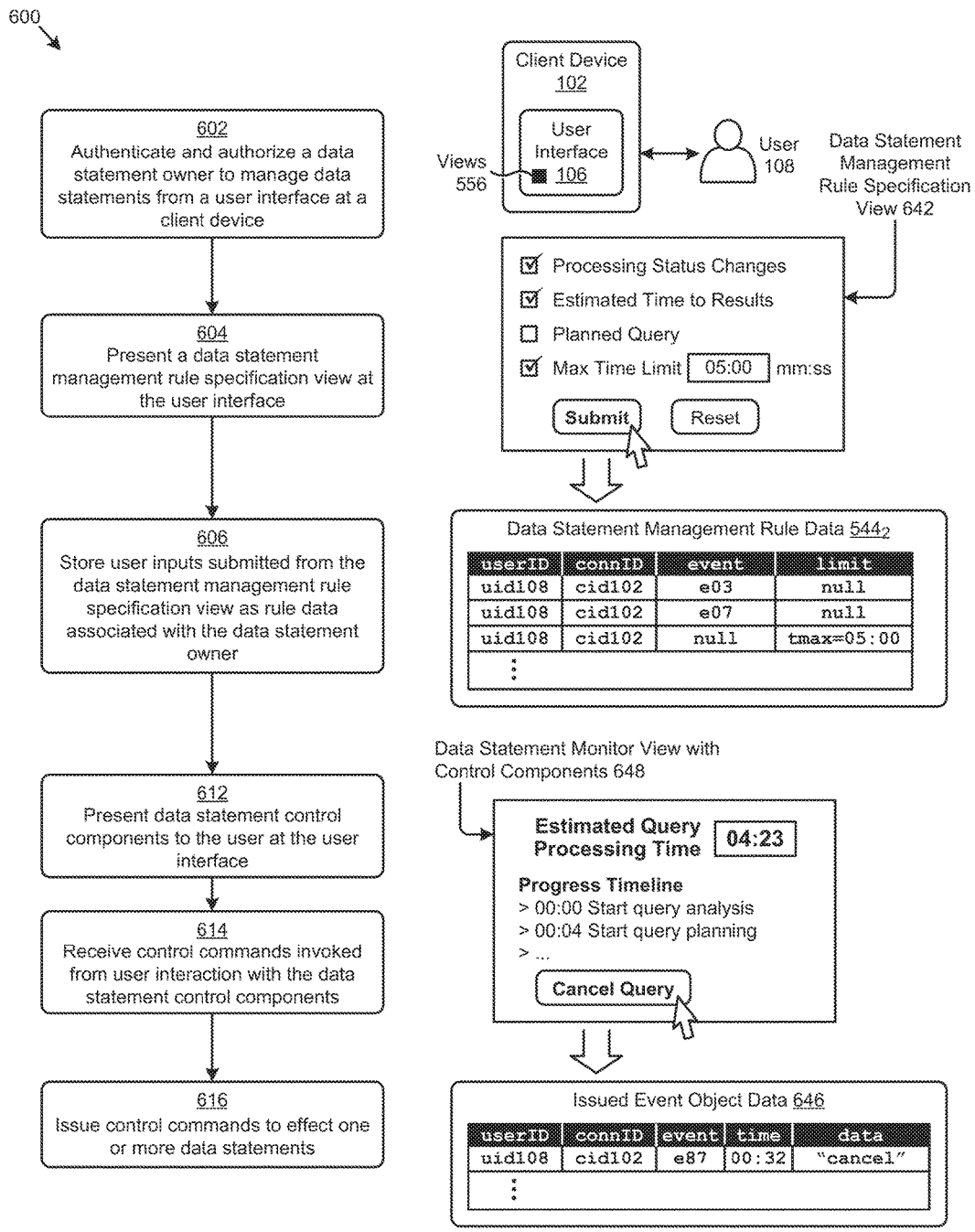
FIG. 6 illustrates a data statement control technique as implemented in systems that facilitate real-time data statement monitoring and control over multiple data storage environments, according to an embodiment.

One embodiment of a data statement control technique for performing rule specification operations, data statement interaction operations, and/or other operations according to the herein disclosed techniques is presented and discussed as pertains to FIG. 6.

FIG. 6 illustrates a data statement control technique 600 as implemented in systems that facilitate real-time data statement monitoring and control over multiple data storage environments. As an option, one or more variations of data statement control technique 600 or any aspect thereof may be implemented in the context of the architecture and functionality of the embodiments described herein. The data statement control technique 600 or any aspect thereof may be implemented in any environment.

The data statement control technique 600 presents one embodiment of certain steps and/or operations for real-time control of data statements and/or other operations in accordance with the herein disclosed techniques. Various illustrations are also shown to further describe the data statement control technique 600.

As shown, data statement control technique 600 can commence by authenticating and authorizing a data statement owner to manage data statements (e.g., specify data statement management rules, control data statements in real time, monitor data statements in real time, etc.) from a user interface at a client device (step 602). As depicted in the example illustrations, the data statement owner might be user 108 with access to user interface 106 at client device 102. When the data statement owner is authenticated and authorized, a data statement management rule specification view can be presented as one of various views (e.g., views 556) in the user interface (e.g., user interface 106) to facilitate selection of certain data statement management rule parameters (step 604).

The example representation of a data statement management rule specification view 642 illustrates the data statement owner (e.g., user 108) has indicated an interest in monitoring "Processing Status Changes" events and "Estimated Time to Results" events. The data statement owner has also set a maximum query execution time limit (e.g., "Max Time Limit") of "05:00" minutes. These user inputs submitted (e.g., by clicking the "Submit" button) from the data statement management rule specification view are stored as rule data associated with the data statement owner (step 606). For example, the selected data shown in data statement management rule data 544$_2$ depicts a set of rule data associated with a data statement owner identified by the combination of "userID=uid108" and "connID=cid102". These rule data are derived from the selections in data statement management rule specification view 642. Specifically, the "e03" event type monitoring rule is derived from the "Processing Status Changes" selection, the "e07" event type monitoring rule is derived from the "Estimated Time to Results" selection, and the "limit" key-value pair of "tmax=05:00" is derived from the "Max Time Limit" setting of "05:00" minutes.

According to the data statement control technique 600, certain data statement control components might also be presented to a user at a user interface (step 612). For example, a "Cancel Query" button might be presented to user 108 at user interface 106 in a data statement monitor view with control components 648. The user might click this button to invoke a control command to cancel the associated query. Such control commands invoked by user interactions with the data statement control components are received (step 614) and issued to effect one or more associated data statements (step 616). In certain embodiments, one or more control commands might be issued by one or more computing processes with no user interaction. In certain embodiments, the invoked control commands are transformed into respective event objects that are delivered to certain target data statement processing agents over an event bus. As an example, the "Cancel Query" action might be transformed to an event object of event type "e87" having "data" comprising the string "cancel" as indicated by the example instance of issued event object data 646 shown in FIG. 6.

Additional Embodiments of the Disclosure

Additional Practical Application Examples

Figure 7:
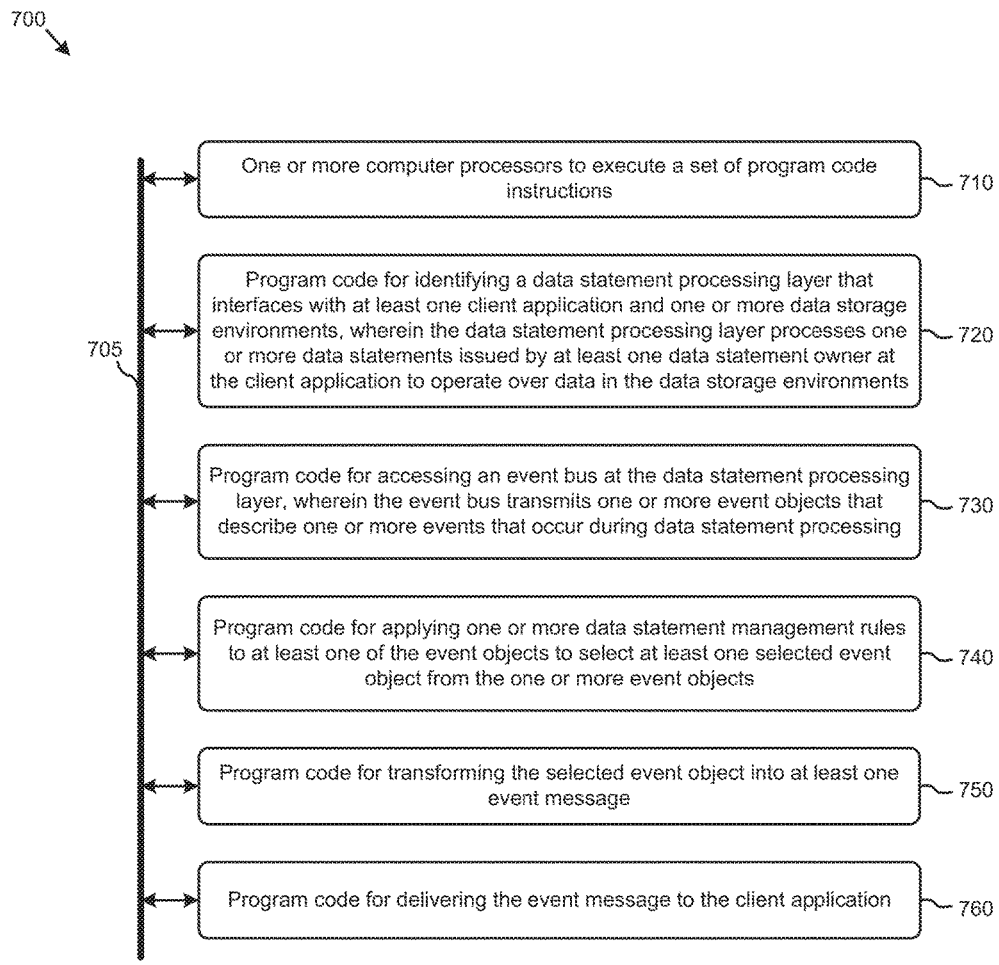
FIG. 7 depicts system components as arrangements of computing modules that are interconnected so as to implement certain of the herein-disclosed embodiments.

FIG. 7 depicts a system 700 as an arrangement of computing modules that are interconnected so as to operate cooperatively to implement certain of the herein-disclosed embodiments. This and other embodiments present particular arrangements of elements that, individually and/or as combined, serve to form improved technological processes that address missing or low-functionality data statement management capability pertaining to data statements issued to operate over multiple heterogeneous data storage environments. The partitioning of system 700 is merely illustrative and other partitions are possible. As an option, the system 700 may be implemented in the context of the architecture and functionality of the embodiments described herein. Of course, however, the system 700 or any operation therein may be carried out in any desired environment. The system 700 comprises at least one processor and at least one memory, the memory serving to store program instructions corresponding to the operations of the system. As shown, an operation can be implemented in whole or in part using program instructions accessible by a module. The modules are connected to a communication path 705, and any operation can communicate with other operations over communication path 705. The modules of the system can, individually or in combination, perform method operations within system 700. Any operations performed within system 700 may be performed in any order unless as may be specified in the claims. The shown embodiment implements a portion of a computer system, presented as system 700, comprising one or more computer processors to execute a set of program code instructions (module 710) and modules for accessing memory to hold program code instructions to perform: identifying a data statement processing layer that interfaces with at least one client application and one or more data storage environments, wherein the data statement processing layer processes one or more data statements issued by at least one data statement owner at the client application to operate over data in the data storage environments (module 720); accessing an event bus at the data statement processing layer, wherein the event bus transmits one or more event objects that describe one or more events that occur during data statement processing (module 730); applying one or more data statement management rules to at least one of the event objects to select at least one selected event object from the one or more event objects (module 740); transforming the selected event object into at least one event message (module 750); and delivering the event message to the client application (module 760).

Variations of the foregoing may include more or fewer of the shown modules. Certain variations may perform more or fewer (or different) steps, and/or certain variations may use data elements in more, or in fewer (or different) operations.

Still further, some embodiments include variations in the operations performed, and some embodiments include variations of aspects of the data elements used in the operations.

System Architecture Overview

Additional System Architecture Examples

Figure 8A:
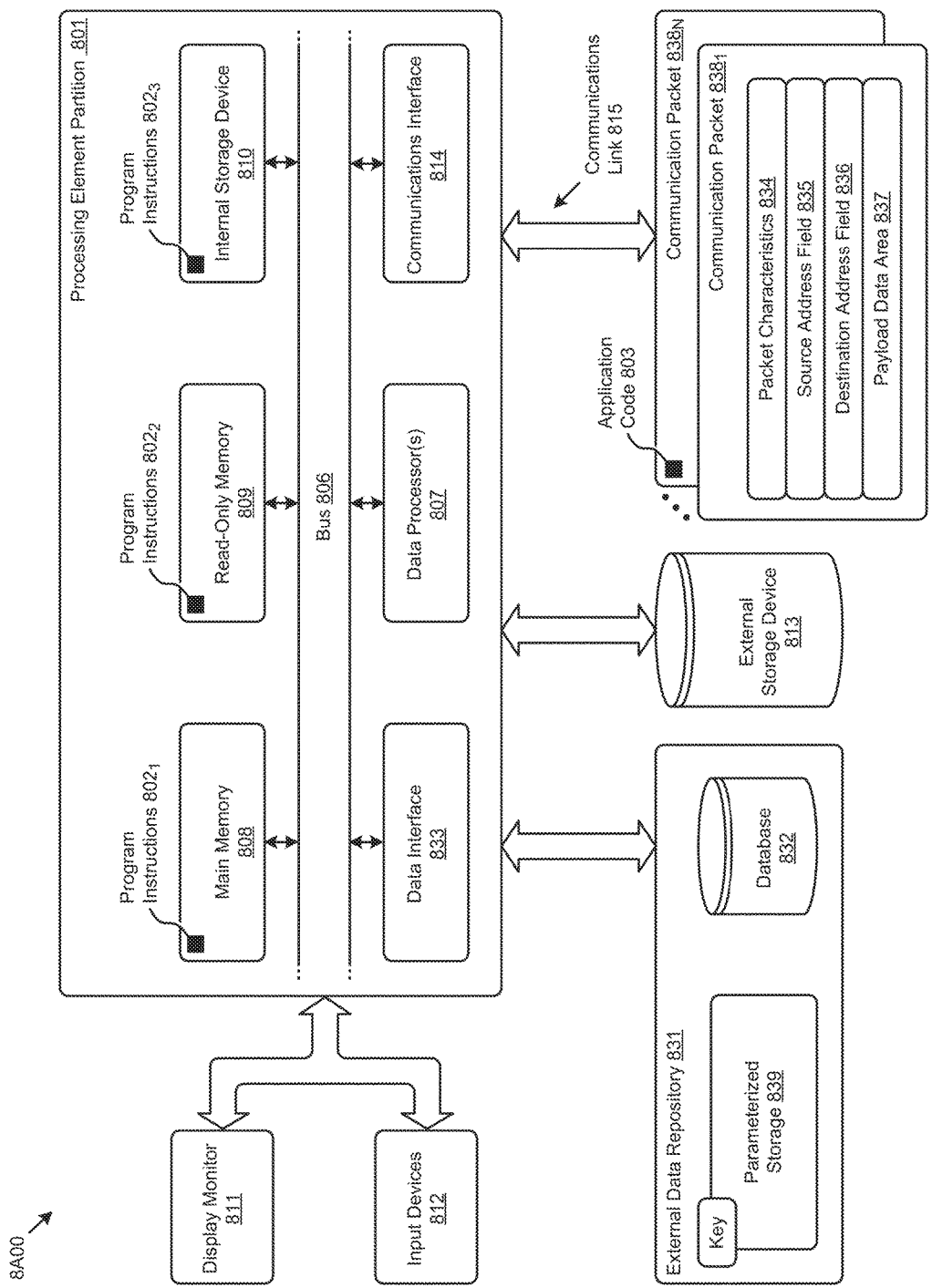
FIG. 8A and FIG. 8B present block diagrams of computer system architectures having components suitable for implementing embodiments of the present disclosure, and/or for use in the herein-described environments.

FIG. 8A depicts a block diagram of an instance of a computer system 8A00 suitable for implementing embodiments of the present disclosure. Computer system 8A00 includes a bus 806 or other communication mechanism for communicating information. The bus interconnects subsystems and devices such as a CPU, or a multi-core CPU (e.g., data processor 807), a system memory (e.g., main memory 808, or an area of random access memory (RAM)), a non-volatile storage device or non-volatile storage area (e.g., read-only memory or ROM 809), an internal storage device 810 or external storage device 813 (e.g., magnetic or optical), a data interface 833, a communications interface 814 (e.g., PHY, MAC, Ethernet interface, modem, etc.). The aforementioned components are shown within processing element partition 801, however other partitions are possible. The shown computer system 8A00 further comprises a display 811 (e.g., CRT or LCD), various input devices 812 (e.g., keyboard, cursor control), and an external data repository 831.

According to an embodiment of the disclosure, computer system 8A00 performs specific operations by data processor 807 executing one or more sequences of one or more program code instructions contained in a memory. Such instructions (e.g., program instructions $802_1$, program instructions $802_2$, program instructions $802_3$, etc.) can be contained in or can be read into a storage location or memory from any computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 8A00 performs specific networking operations using one or more instances of communications interface 814. Instances of the communications interface 814 may comprise one or more networking ports that are configurable (e.g., pertaining to speed, protocol, physical layer characteristics, media access characteristics, etc.) and any particular instance of the communications interface 814 or port thereto can be configured differently from any other particular instance. Portions of a communication protocol can be carried out in whole or in part by any instance of the communications interface 814, and data (e.g., packets, data structures, bit fields, etc.) can be positioned in storage locations within communications interface 814, or within system memory, and such data can be accessed (e.g., using random access addressing, or using direct memory access DMA, etc.) by devices such as data processor 807.

The communications link 815 can be configured to transmit (e.g., send, receive, signal, etc.) any types of communications packets (e.g., communications packets $838_1$, . . . , communications packets $838_N$) comprising any organization of data items. The data items can comprise a payload data area 837, a destination address 836 (e.g., a destination IP address), a source address 835 (e.g., a source IP address), and can include various encodings or formatting of bit fields to populate the shown packet characteristics 834. In some cases, the packet characteristics include a version identifier, a packet or payload length, a traffic class, a flow label, etc. In some cases, the payload data area 837 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 807 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 831, which in turn can be formatted into any one or more storage areas, and which can comprise parameterized storage 839 accessible by a key (e.g., filename, table name, block address, offset address, etc.).

Execution of the sequences of instructions to practice certain embodiments of the disclosure are performed by a single instance of the computer system 8A00. According to certain embodiments of the disclosure, two or more instances of computer system 8A00 coupled by a communications link 815 (e.g., LAN, PTSN, or wireless network) may perform the sequence of instructions required to practice embodiments of the disclosure using two or more instances of components of computer system 8A00.

The computer system 8A00 may transmit and receive messages such as data and/or instructions organized into a data structure (e.g., communications packets). The data structure can include program instructions (e.g., application code 803), communicated through communications link 815 and communications interface 814. Received program code may be executed by data processor 807 as it is received and/or stored in the shown storage device or in or upon any other non-volatile storage for later execution. Computer system 8A00 may communicate through a data interface 833 to a database 832 on an external data repository 831. Data items in a database can be accessed using a primary key (e.g., a relational database primary key).

The processing element partition 801 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 807. Some embodiments include one or more special-purpose hardware components (e.g., power control, logic, sensors, transducers, etc.). A module may include one or more state machines and/or combinational logic used to implement or facilitate the operational and/or performance characteristics pertaining to data access authorization for dynamically generated database structures.

Various implementations of the database 832 comprise storage media organized to hold a series of records or files such that individual records or files are accessed using a name or key (e.g., a primary key or a combination of keys and/or data statement clauses). Such files or records can be organized into one or more data structures (e.g., data structures used to implement or facilitate aspects of data access authorization for dynamically generated database structures). Such files or records can be brought into and/or stored in volatile or non-volatile memory.

Figure 8B:
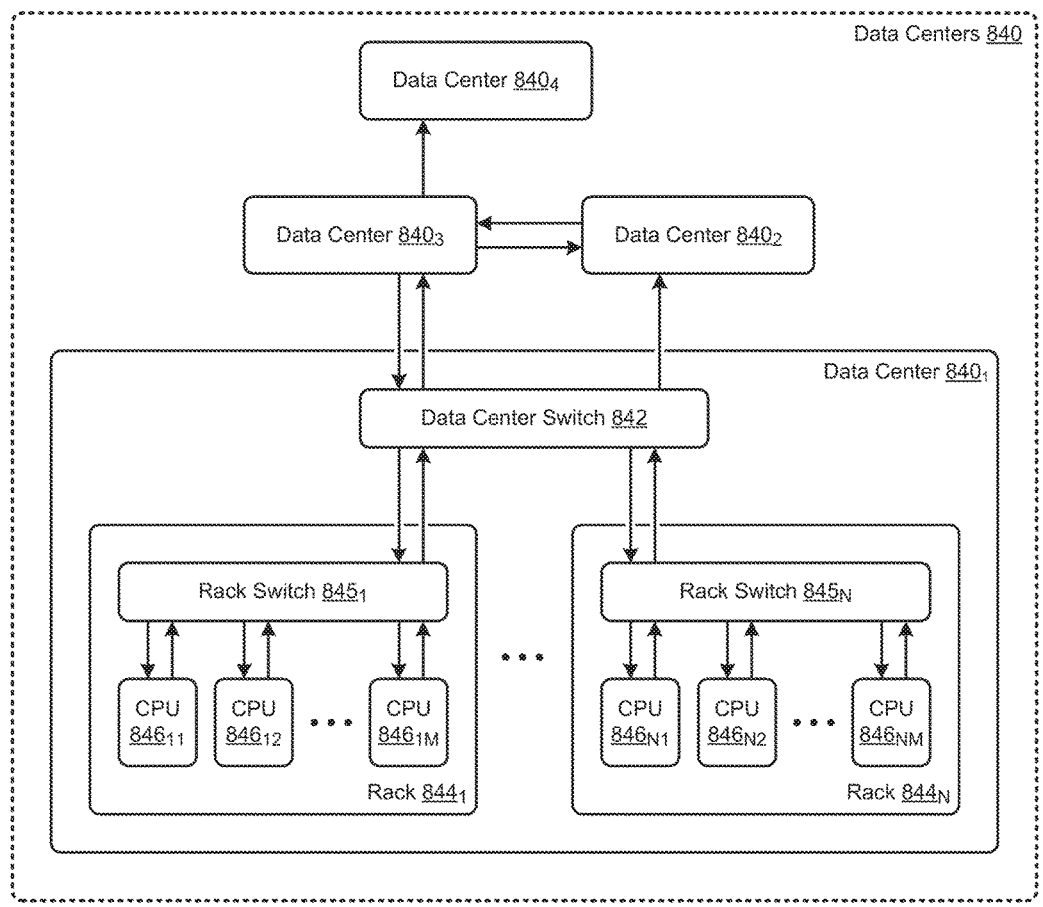

FIG. 8B depicts a block diagram of an instance of a distributed data processing system 8B00 that may be included in a system implementing instances of the herein-disclosed embodiments.

Distributed data processing system 8B00 can include many more or fewer components than those shown. The distributed data processing system 8B00 can be used to store data, perform computational tasks, and/or transmit data between a plurality of data centers 840 (e.g., data center $840_1$, data center $840_2$, data center $840_3$, and data center $840_4$). The distributed data processing system 8B00 can include any number of data centers. Some of the plurality of data centers 840 might be located geographically close to each other, while others might be located far from the other data centers.

The components of distributed data processing system 8B00 can communicate using dedicated optical links and/or other dedicated communication channels, and/or supporting hardware such as modems, bridges, routers, switches, wireless antennas, wireless towers, and/or other hardware components. In some embodiments, the component interconnections of the distributed data processing system 8B00 can include one or more wide area networks (WANs), one or more local area networks (LANs), and/or any combination of the foregoing networks. In certain embodiments, the component interconnections of the distributed data processing system 8B00 can comprise a private network designed and/or operated for use by a particular enterprise, company, customer, and/or other entity. In other embodiments, a public network might comprise a portion or all of the component interconnections of the distributed data processing system 8B00.

In some embodiments, each data center can include multiple racks that each include frames and/or cabinets into which computing devices can be mounted. For example, as shown, data center $840_1$ can include a plurality of racks (e.g., rack $844_1$, . . . , rack $844_N$), each comprising one or more computing devices. More specifically, rack $844_1$ can include a first plurality of CPUs (e.g., CPU $846_{11}$, CPU $846_{12}$, . . . , CPU $846_{1M}$), and rack $844_N$ can include an Nth plurality of CPUs (e.g., CPU $846_{N1}$, CPU $846_{N2}$, . . . , CPU $846_{NM}$). The plurality of CPUs can include data processors, network attached storage devices, and/or other computer controlled devices. In some embodiments, at least one of the plurality of CPUs can operate as a master processor, controlling certain aspects of the tasks performed throughout the distributed data processing system 8B00. For example, such master processor control functions might pertain to scheduling, data distribution, and/or other processing operations associated with the tasks performed throughout the distributed data processing system 8B00. In some embodiments, one or more of the plurality of CPUs may take on one or more roles, such as a master and/or a slave. One or more of the plurality of racks can further include storage (e.g., one or more network attached disks) that can be shared by one or more of the CPUs.

In some embodiments, the CPUs within a respective rack can be interconnected by a rack switch. For example, the CPUs in rack $844_1$ can be interconnected by a rack switch $845_1$. As another example, the CPUs in rack $844_N$ can be interconnected by a rack switch $845_N$. Further, the plurality of racks within data center $840_1$ can be interconnected by a data center switch 842. The distributed data processing system 8B00 can be implemented using other arrangements and/or partitioning of multiple interconnected processors, racks, and/or switches. For example, in some embodiments, the plurality of CPUs can be replaced by a single large-scale multiprocessor.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for enhancing data statement management capabilities when operating on data over one or more data storage environments, the method comprising:
   identifying a data statement processing layer that interfaces with at least one client application and the one or more data storage environments, wherein the data statement processing layer processes one or more data statements issued by at least one data statement owner at the client application to operate over data in the data storage environments;
   accessing an event bus at the data statement processing layer, wherein the event bus transmits one or more event objects that describe one or more events that occur during data statement processing;
   applying one or more data statement management rules to at least one of the event objects to select at least one selected event object from the one or more event objects;
   transforming the selected event object into at least one event message; and
   delivering the event message to the client application.

2. The method of claim 1, further comprising:
   receiving at least one control command from the client application; and
   issuing the control command to the data statement processing layer to affect the data statement processing.

3. The method of claim 2, further comprising transforming the control command into at least one of the event objects on the event bus.

4. The method of claim 1, further comprising receiving at least a portion of the data statement management rules from the client application.

5. The method of claim 4, wherein the portion of the data statement management rules are derived from one or more user inputs captured by a user interface at the client application.

6. The method of claim 1, further comprising:
receiving one or more credentials associated with the data statement owner;
authorizing the data statement owner based at least in part on the credentials; and
accessing the data statement management rules in response to authorizing the data statement owner.

7. The method of claim 6, wherein the credentials comprise at least one of, a user identifier, a connection identifier, a client device identifier, or a client application identifier.

8. The method of claim 1, wherein transforming the selected event object into the event message further comprises generating at least one of, at least one JSON message, or at least one XML message, based at least in part on one or more object attributes of the selected event object.

9. The method of claim 1, wherein the event message describes at least one of, a received query, an incoming query, a planned query, an outgoing query, a query execution time estimate, a query completion indicator, a query failure indicator, or one or more subquery operations.

10. The method of claim 1, wherein one or more operations of the method are responsive to receiving at least one of the data statements at the data statement processing layer.

11. The method of claim 1, wherein one or more operations of the method are performed over an unmodified instance of at least one of, the client application, or one or more of the data storage environments.

12. A computer readable medium, embodied in a non-transitory computer readable medium, the non-transitory computer readable medium having stored thereon a sequence of instructions which, when stored in memory and executed by one or more processors causes the one or more processors to perform a set of acts for enhancing data statement management capabilities when operating on data over one or more data storage environments, the acts comprising:
identifying a data statement processing layer that interfaces with at least one client application and the one or more data storage environments, wherein the data statement processing layer processes one or more data statements issued by at least one data statement owner at the client application to operate over data in the data storage environments;
accessing an event bus at the data statement processing layer, wherein the event bus transmits one or more event objects that describe one or more events that occur during data statement processing;
applying one or more data statement management rules to at least one of the event objects to select at least one selected event object from the one or more event objects;
transforming the selected event object into at least one event message; and
delivering the event message to the client application.

13. The computer readable medium of claim 12, further comprising instructions which, when stored in memory and executed by the one or more processors causes the one or more processors to perform acts of:
receiving at least one control command from the client application; and
issuing the control command to the data statement processing layer to affect the data statement processing.

14. The computer readable medium of claim 13, further comprising instructions which, when stored in memory and executed by the one or more processors causes the one or more processors to perform acts of transforming the control command into at least one of the event objects on the event bus.

15. The computer readable medium of claim 12, further comprising instructions which, when stored in memory and executed by the one or more processors causes the one or more processors to perform acts of receiving at least a portion of the data statement management rules from the client application.

16. The computer readable medium of claim 15, wherein the portion of the data statement management rules are derived from one or more user inputs captured by a user interface at the client application.

17. The computer readable medium of claim 12, further comprising instructions which, when stored in memory and executed by the one or more processors causes the one or more processors to perform acts of:
receiving one or more credentials associated with the data statement owner;
authorizing the data statement owner based at least in part on the credentials; and
accessing the data statement management rules in response to authorizing the data statement owner.

18. The computer readable medium of claim 17, wherein the credentials comprise at least one of, a user identifier, a connection identifier, a client device identifier, or a client application identifier.

19. A system for enhancing data statement management capabilities when operating on data over one or more data storage environments, the system comprising:
a storage medium having stored thereon a sequence of instructions; and
one or more processors that execute the instructions to cause the one or more processors to perform a set of acts, the acts comprising,
identifying a data statement processing layer that interfaces with at least one client application and the one or more data storage environments, wherein the data statement processing layer processes one or more data statements issued by at least one data statement owner at the client application to operate over data in the data storage environments;
accessing an event bus at the data statement processing layer, wherein the event bus transmits one or more event objects that describe one or more events that occur during data statement processing;
applying one or more data statement management rules to at least one of the event objects to select at least one selected event object from the one or more event objects;
transforming the selected event object into at least one event message; and
delivering the event message to the client application.

20. The system of claim 19, wherein at least a portion of the data statement management rules are received from the client application.

* * * * *